United States Patent
Li et al.

(10) Patent No.: US 9,115,980 B2
(45) Date of Patent: Aug. 25, 2015

(54) ROW BAR THICKNESS MEASUREMENT DEVICE, SYSTEM AND METHODS

(71) Applicant: Seagate Technology LLC, Cupertino, CA (US)

(72) Inventors: Leping Li, Bloomington, MN (US); Sarah R. Marotz, Bloomington, MN (US); Kara L. Maytag, Plymouth, MN (US)

(73) Assignee: SEAGATE TECHNOLOGY, LLC, Cupertino, CA (US)

( * ) Notice: Subject to any disclaimer, the term of this patent is extended or adjusted under 35 U.S.C. 154(b) by 41 days.

(21) Appl. No.: 14/036,893

(22) Filed: Sep. 25, 2013

(65) Prior Publication Data

US 2015/0082650 A1    Mar. 26, 2015

(51) Int. Cl.
  *G01B 11/06* (2006.01)
  *G01B 3/18* (2006.01)

(52) U.S. Cl.
  CPC . *G01B 3/18* (2013.01); *G01B 11/06* (2013.01)

(58) Field of Classification Search
  CPC ..... G01B 3/18; G01B 311/06; G01B 11/0608
  USPC ........... 33/533, 549, 551, 783, 784, 832, 833
  See application file for complete search history.

(56) References Cited

U.S. PATENT DOCUMENTS

| | | |
|---|---|---|
| 5,017,012 A | 5/1991 | Merritt, Jr. et al. |
| 5,761,999 A * | 6/1998 | Lippold et al. ................. 101/484 |
| 6,157,450 A | 12/2000 | Marchese-Ragona et al. |
| 6,428,171 B1 * | 8/2002 | Aoki et al. ..................... 356/634 |
| 6,882,437 B2 | 4/2005 | Moghaddam et al. |
| 7,061,601 B2 | 6/2006 | Meeks |
| 7,084,979 B1 | 8/2006 | Aiyer |
| 7,738,113 B1 | 6/2010 | Marx et al. |
| 7,987,583 B2 | 8/2011 | Tokutomi et al. |
| 8,943,703 B2 * | 2/2015 | Hayashida ...................... 33/784 |
| 2004/0003739 A1 * | 1/2004 | Leif .............................. 101/484 |
| 2009/0073460 A1 * | 3/2009 | Mizuta et al. ................. 356/614 |
| 2014/0207411 A1 * | 7/2014 | Laurent et al. ................ 702/159 |
| 2014/0362359 A1 * | 12/2014 | Chao et al. ....................... 355/67 |
| 2014/0368830 A1 * | 12/2014 | Michelt et al. ................ 356/485 |
| 2015/0016071 A1 * | 1/2015 | Nishioka et al. .............. 361/748 |

* cited by examiner

*Primary Examiner* — G. Bradley Bennett
(74) *Attorney, Agent, or Firm* — HolzerIPLaw, PC

(57) ABSTRACT

A device and system for precise measurement of a thickness and determination of a profile of a slider row bar. The device includes a bar mount fixture having a structure for supporting the row bar by an edge, a first probe and a second probe on either side of the row bar, each probe being a non-contact sensor with a measurement precision of 0.5 micrometer, with each of the probes laterally moveable in relation to the bar mount fixture. Also included are methods of using a device for precisely measuring of a thickness and determining of a profile of a slider row bar.

20 Claims, 4 Drawing Sheets

ROW BAR THICKNESS MEASUREMENT DEVICE, SYSTEM AND METHODS

BACKGROUND

Hard disc drive systems (HDDs) typically include one or more data storage discs and one or more sliders, each of which contains transducing heads that are used to read from and write to a data track on a corresponding disc media. The transducing heads and sliders are typically produced by a thin film based wafer process followed by an air-bearing surface process. In a typical slider manufacturing process, a wafer loaded with already-formed transducing heads is sliced into rectangular shaped chunks that are then sliced into rows or bars, each containing a number of transducing heads (e.g., 64 heads). The sliced surfaces of the bars are then subjected to various lapping steps. The fully lapped and surface patterned bars are eventually diced to form individual sliders. During the lapping, multiple row bars are mounted on tooling and lapped simultaneously for operational efficiency. In order to obtain accurate lapping of the multiple bars, each of these multiple bars should be measured and sorted with close or similar physical dimensions prior to the lapping process.

The present invention provides a system and device for quickly and accurately measuring the dimensions of the slider row bars.

SUMMARY

One particular embodiment of this disclosure is a device for measuring a thickness and determining a profile of a slider row bar. The device includes a bar mount fixture having a structure for supporting the row bar by a lower edge thereon, a first probe and a second probe, each probe being a non-contact sensor with a measurement precision of 0.5 micrometer, with each of the probes oriented toward the supporting structure and laterally moveable in relation to the bar mount fixture. Another embodiment of this disclosure is a system for determining the thickness and profile of a slider row bar, the system comprising a measurement device and software configured to present a measured row bar thickness and determined row bar profile to a user.

Another particular embodiment of this disclosure is a device for measuring a thickness and determining a profile of a slider row bar having an air bearing surface (ABS) side, a backside surface, a trailing edge side surface, a leading edge side surface, a first end and an opposite second end. The device includes a bar mount fixture having a structure for supporting the row bar thereon, and a measurement unit having a first probe configured to be positioned proximate the ABS side of the row bar and a second probe position configured to be positioned proximate the backside surface of the row bar, each probe being a non-contact sensor with a measurement precision of 0.5 micrometer. The measurement unit is laterally moveable in relation to the bar mount fixture. The probes may be spectral-interference laser sensors.

Another particular embodiment of this disclosure is a method for determining the thickness and profile of a slider row bar, the row bar having an ABS surface, a backside surface, and a thickness therebetween, the row bar further having a leading edge side surface and a trailing edge side surface. The method includes supporting the row bar on its leading edge side surface or its trailing edge side surface, knowing a distance between a first known point and a second known point, measuring a distance to the ABS surface from the first known point, measuring a distance to the backside surface from the second known point, and calculating the thickness of the row bar by subtracting the distance to the ABS surface from the first known point and the distance to the backside surface from the second known point from the distance between the first known point and the second known point.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments are directed to a measurement device, a system, and a method to measure the thickness and determine the profile shape of a slider row bar, such as during the manufacturing process of a slider having transducing heads capable of reading and writing information from or to recording media. With the measurement device, blind spots along the row bar and gravitation-induced distortion, bending and waviness of the row bar, caused by the measurement device, are inhibited and generally avoided.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1:
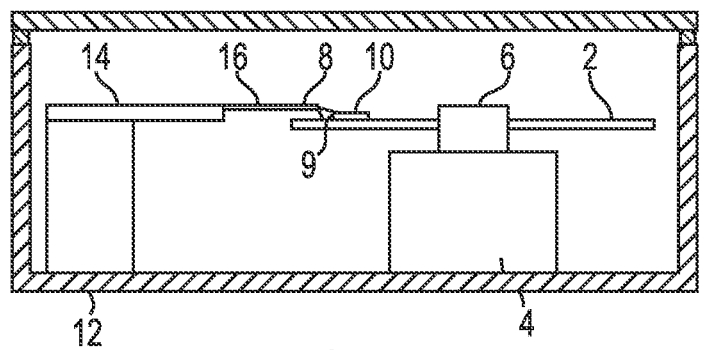
FIG. 1 is a sectional side view of a magnetic recording disc drive and slider assembly.
Figure 2:
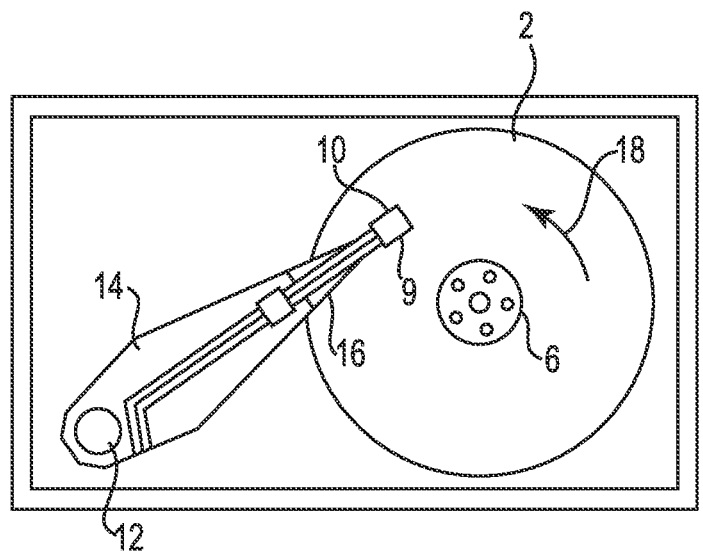
FIG. 2 is a top view of the magnetic recording disc drive and slider assembly of FIG. 1.

Referring to FIGS. 1 and 2, a generic magnetic recording disc drive is illustrated, having a magnetic recording disc 2 which is rotated by drive motor 4 with hub 6 which is attached to the drive motor 4. A read/write head or transducer 8 is present on the trailing end 9 of a slider 10. Slider 10 is part of a head stack assembly (HSA) that is mounted on an actuator 12, and also contains a rigid arm 14 and a suspension element 16. During operation of the disc drive, drive motor 4 rotates disc 2 at a constant speed in the direction of arrow 18 and actuator 12 which is typically a linear or rotary motion coil motor drives slider 10 generally radially across the plane of the surface of disc 2 so that read/write head 8 may access different data tracks on disc 2. The disc drive of these figures has a single disc 2, slider 10, actuator 12, etc; it is understood that other embodiments could have multiple discs with an appropriate numbers of sliders 10, actuators 12, etc.

In order to meet the increasing demands for more and more data storage capacity on disc 2, slider fabrication and finishing must be improved to meet these demands. To meet these demands, lapping and polishing methodology must be done with a high degree of accuracy, for example, on the order of 0.5 micrometer. As described above, numerous sliders are typically fabricated from a single wafer having arrays of magnetic transducer heads formed on the wafer surface using semiconductor-type technology. Single-row bars are sliced from a rectangular chunk which is first sliced off the wafer, each bar being a row of units that are further processed into sliders each having one or more magnetic transducers or heads on their end faces. Each bar is attached to a fixture via one of its sliced surfaces and is processed by various lapping steps and subsequent processing steps, and is finally diced, i.e., separated, into individual sliders.

In order to achieve better performance of the slider during its use, the head, particularly the sensing elements of the head, must have precise dimensions. During manufacturing, it is most critical to grind or lap these elements to very close tolerances in order to achieve the unimpaired functionality required of sliders. For efficient processing, multiple row bars, having the same or similar dimensions, are lapped simultaneously.

Figure 3:
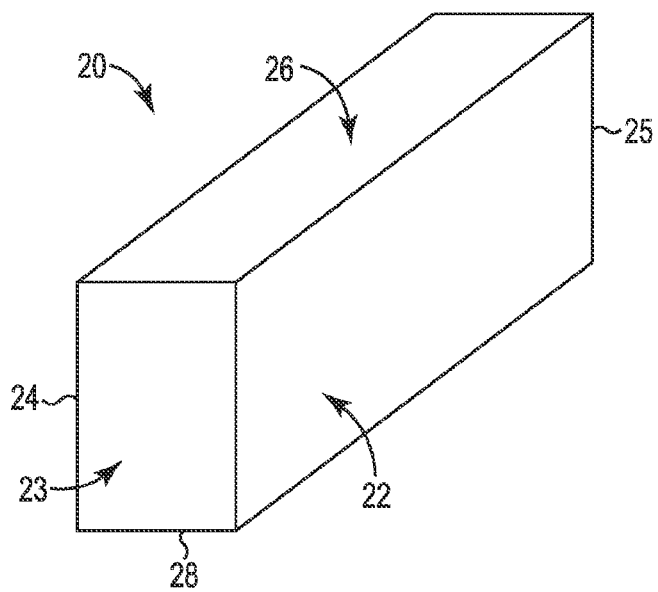
FIG. 3 is a perspective view of a slider row bar.

Slider row bars, directly from the process that slices them from the wafer, can have a wide range of dimensions and/or profiles. FIG. 3 illustrates a generic slider row bar 20. Throughout this disclosure, the terms "slider row bar", "row bar" and "bar" are used interchangeably. Slider row bar 20 has a body defined by a first surface 22, an opposite second surface 24, a third surface 26, a fourth surface 28, a first end 23 and a second opposite end 25. Typically, row bar 20 is a rectangular cuboid with first and second surfaces 22, 24 larger than third and fourth surfaces 26, 28, and with rectangular ends 23, 25. To reduce confusion in the following discussion, first surface 22 will be referred to as air bearing surface side 22 or ABS side 22, second surface 24 will be referred to as backside surface 24, third surface 26 will be referred to as leading edge side surface 26 or LES surface 26, and fourth surface 28 will be referred to as trailing edge side surface 28 or TES surface 28.

Figure 3A:
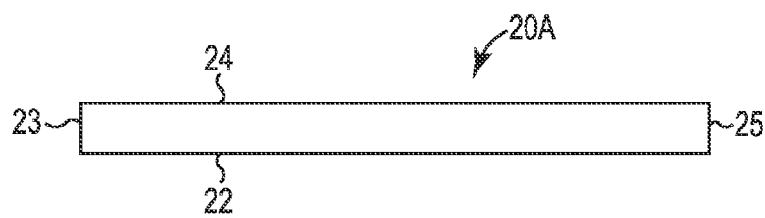
FIG. 3A is a top view of a first specific embodiment of a slider row bar.
Figure 3B:
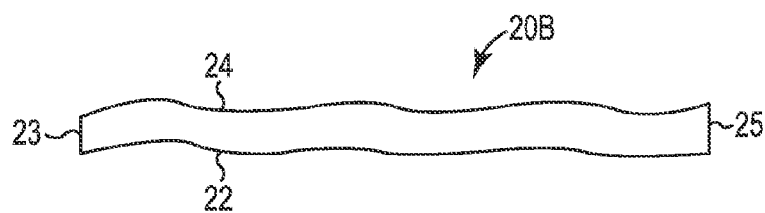
FIG. 3B is a top view of a second specific embodiment of a slider row bar.
Figure 3C:
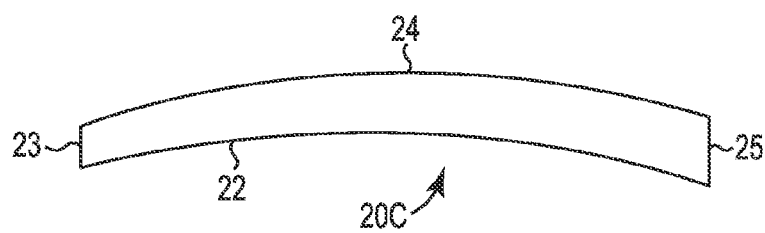
FIG. 3C is a top view of a third specific embodiment of a slider row bar.

Typically, the process of slicing these row bars 20 from the wafer is not sufficiently accurate to achieve the desired dimensional tolerance (e.g., 0.5 micrometer). Typically, immediately after slicing from the rectangular wafer chunk, row bars 20 have a thickness (from ABS side 22 to backside surface 24) of 270 micrometers or 220 micrometers, a height (from LES surface 26 to TES surface 28) of 1.25 mm or 0.85 mm, and a length (from end 23 to end 25) of about 53 mm, respectively. The row bars may have a varying thickness from their first end 23 to their second end 25, and either or both of surfaces 22, 24 may not be flat. FIGS. 3A, 3B and 3C illustrate three embodiments of row bars, as received from a slicing process; each of these figures shows the profile of the row bar, calling out ABS side 22, backside surface 24, and ends 23, 25. Typically, surfaces 26, 28 are sufficiently straight/flat as these surfaces 26, 28 are unmodified from the wafer specifications.

Row bar 20A of FIG. 3A has a uniform thickness from end 23 to end 25, or, a constant distance between ABS side 22 and backside surface 24, so that ABS side 22 and backside surface 24 are parallel. Both ABS side 22 and backside surface 24 are planar, resulting in a straight profile. Such is an ideal row bar.

Row bar 20B of FIG. 3B has a varying thickness from end 23 to end 25, or, a varying distance between ABS side 22 and backside surface 24. Additionally, row bar 20B has an irregular profile, where ABS side 22 and backside surface 24 are not planar and are not parallel to each other. Row bar 20B can be generally referred to as having a non-straight profile.

Similarly, row bar 20C of FIG. 3C has a thickness increasing from end 23 to end 25. Additionally, row bar 20C has profile where ABS side 22 and backside surface 24 are not planar and are not parallel to each other. Row bar 20C can be generally referred to as having an arcuate or curved profile.

In an ideal manufacturing process, all the slider row bars would be like row bar 20A, having the same thickness between ABS side 22 and backside surface 24 and a flat or straight profile. Typically, ideal (or close to ideal) row bars 20, prior to lapping, have a thickness (from ABS side 22 to backside surface 24) of 270 or 220 micrometers. After lapping, row bars 20 often have a thickness of either 230 or 180 micrometers. This disclosure provides a mechanism to determine the row bar's profile and thickness.

Figure 4:
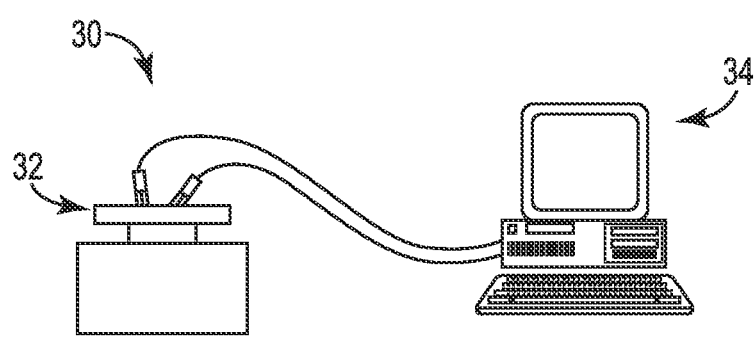
FIG. 4 is a schematic front view of a system of the present invention.

FIG. 4 illustrates a measurement system to determine the thickness and profile of a slider row bar. System 30 includes a measurement device 32 operably connected to a computer 34. Not illustrated in FIG. 4, system 30 includes other processing equipment, such as, for example, a spectrometer(s) and/or a control/display unit. Measurement device 32, described in further detail below in respect to FIGS. 5, 6A and 6B, includes at least two probes (each which may have a spectrometer) that are operably connected to appropriate processing equipment and/or to computer 34.

Computer 34 includes appropriate programming and a graphical user interface (GUI) for operation of device 32, which includes features such as bar placement, probe head-head gap calibration, movement of pair of probes to map out the thickness and profile of the slider row bar, and removal of bar from measurement device 30, activities which are discussed below. Computer 34 also includes other application programming, for example, that allows processing of saved measurement data for 2D and/or 3D displays of total thickness and profile variations.

Figure 5:
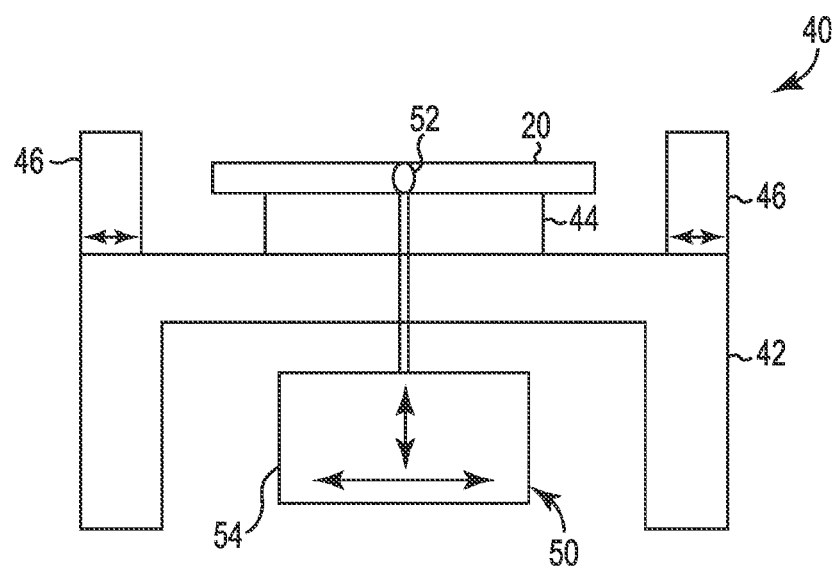
FIG. 5 is a schematic front view of a device of the present invention for determining the thickness and profile of a slider row bar.
Figure 6A:
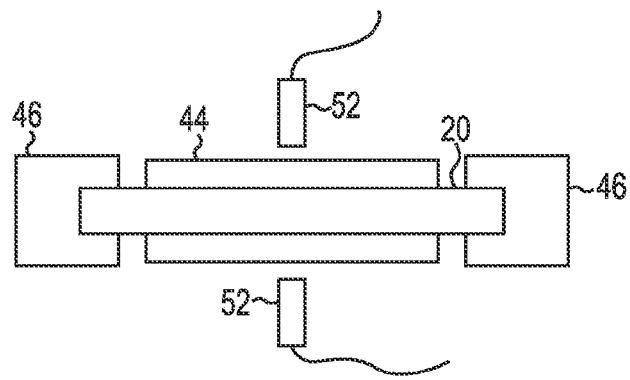
FIG. 6A is a schematic top view of the device of FIG. 5, with the row bar engaged at its ends.
Figure 6B:
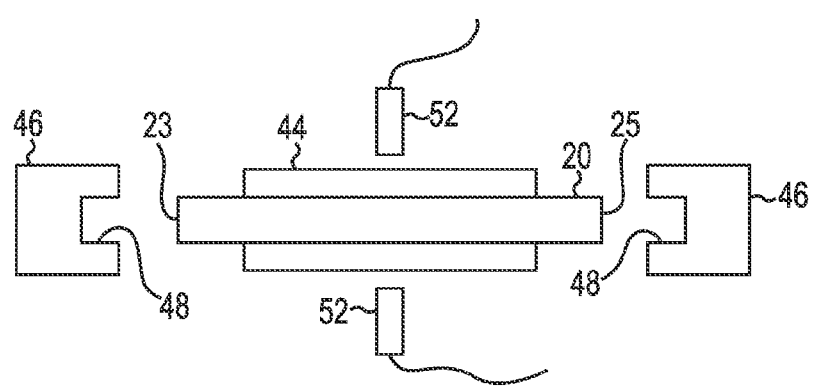
FIG. 6B is a schematic top view of the device of FIG. 5, with the row bar not engaged.

FIGS. 5, 6A and 6B illustrate various features of a testing device that can determine the thickness and the profile of a slider row bar for the entire length of the row bar while avoiding blind spots and gravitation-induced distortion, bending or waviness caused by the testing device or use of the testing device. Turning to FIG. 5, the testing device, shown with a row bar 20 installed, includes a bar mount fixture 40 and a measurement unit 50 that includes a pair of probes 52.

Bar mount fixture 40 has a gantry-style base 42 on which is positioned a gage block 44. Gage block 44 is a highly precise, known thickness, standard that conforms to NIST thickness standards. Row bar 20 is positioned on and supported by gage block 44 in a manner such that the entire ABS side 22 (FIG. 3) and the entire backside surface 24 (FIG. 3) are exposed; that is, no portion of ABS side 22 or backside surface 24 is hidden or shadowed (i.e., there are no blind spots). Gage block 44 may have a length longer or shorter than row bar 20, depending on the length of bar 20 and on the length of gage block 44; in some embodiments, gage block 44 is about ⅔ the length of row bar 20. Row bar 20 should be sufficiently supported on gage block 44 so that row bar 20 does not sag or distort due to gravitation forces acting on unsupported portions of row bar 20.

Not only does gage block 44 support row bar 20 by a bottom edge (i.e., LES surface 26 or TES surface 28), gage block 44 provides a calibration mechanism for the measurement device, as is described below. At each end of base 42 is a laterally movable bar placement mechanism 46 each having a guiding receptacle 48.

Measurement unit 50 includes two sensors, such as optical fiber probes or probe heads 52, (FIGS. 6A, 6B) supported by a base 54, with one probe 52 on each side of gage block 44. Probes 52 are laterally and vertically moveable in relation to bar amount fixture 40. In the particular embodiment illustrated, base 54, with probes 52 fixedly mounted thereon, is laterally and vertically movable in relation to bar mount fixture 40. In other embodiments, probes 52 are movable in relation to bar mount fixture 40. In other embodiments, although not preferred, bar mount fixture 40 is movable in relation to probes 52.

FIGS. 6A and 6B show operation of bar placement mechanisms 46. Prior to placement of bar 20 on gage block 44, mechanisms 46 may move laterally towards the center and stop at positions with a distance therebetween slightly larger than the length of bar 20. Bar 20 is placed (e.g., gently) from the top into receptacles 48 that engage ends 23, 25 of slider row bar 20 and auto center bar 20 on top of gage block 44. In such a manner, engagement mechanism 46 is configured to readily receive, automatically center and properly position slider row bar 20 on top edge of gage block 44. Internal guiding receptacles 48 may be tapered to facilitate receiving and positioning row bar 20 as needed; receptacles 48 adjust to be 'self-centering'. During the measurement process, after row bar 20 is supported on gage bock 44, engagement mechanisms 46 are withdrawn from row bar 20, exposing the entire length of row bar 20 as available for measurement.

Because of the required measurement precision (e.g., within 0.5 micrometers), the various elements of bar mount fixture 40 and measurement unit 50 should have a high degree of accuracy and precision. Either or both base 42, 54 may be formed of any suitable material, but typically will be a solid, relatively heavy and dense material that is rigid, to inhibit undesired distortion of bases 42, 54. Examples of preferred materials for bases 42, 54 include solid aluminum and stainless steel. Any motor or other mechanism used to laterally and/or vertically move base 42 or 54 (typically, base 54) should be selected to provide smooth motion at a highly precise speed. The movement of base 42, 54 can be variable speed, for example, 1 to 40 mm/second.

Gage block 44 typically has a thickness of no more than 1 mm and greater than about 100 micrometers (0.1 mm), although thicker and thinner gage blocks 44 could be used. One example of a suitable gage block 44 is a zirconia ($ZrO_2$) block having a length of 30 mm, a height of 9-10 mm, and thickness of 500 micrometers; such a block 44 is available from Mitutoyo under the designation "Cera Block."

Probes 52 are non-contact (e.g., visual, UV, IR) sensors with precision capability of within 0.5 micrometer. In some embodiments, probes 52 are precise to within 0.4 micrometer. Suitable probes include spectral-interference laser sensors, such as available from Keyence under the series designation "SI-FDD". The "SI-F01" infrared wavelength sensor from Keyence has a sensor head with a beam spot size of 20 micrometers and a sampling cycle of 200 microseconds. In general, a small, low cost, accurate, fast, and non-intrusive and non-contact probe is desired.

The following method can be used to determine the thickness and/or profile of a row bar using the measurement device illustrated in FIG. 5 and described above.

If not present, gage block 44 is positioned on gantry 42 and preferably centered between engagement mechanisms 46. Gage block 44 may be permanently affixed to gantry 42 or may be readily removable and replaceable. Whether permanently or temporarily affixed to gantry 42, gage block 44 should be rigidly affixed to gantry 42. Although not required prior to row bar 20 being measured, probes 52 can be calibrated by having each probe 52 measure the distance to gage block 44. Because the thickness of gage block 44 is precisely known, the distance between the two probes 52 can be determined within the precision of the sensors. In other words, the distance between probes 52 is, for example, the sum of the distance from the first probe 52 to the front surface of gage block 44, the distance from the second probe 52 to the back surface of gage block 44, and the thickness of gage block 44. From this known distance between probes 52, and the measured distances between each probe 52 to the corresponding bar surface (ABS side 22 and backside surface 24), the thickness of row bar 20 can be determined.

A row bar 20 to be measured is placed on the top edge of gage block 44 using engagement mechanisms 46 as guides. With engagement mechanisms 46 in their 'engaging' position, as illustrated in FIG. 6A, row bar 20 is placed into engagement mechanisms 46 by lowering row bar 20 into the internal guiding receptacles 48, typically with LES surface 26 (FIG. 3) being the downward most edge of row bar 20. Internal guiding receptacles 48, having a wider top cross-section tapering to a less wide cross-section, facilitate placing row bar 20 therein and obtaining proper alignment of row bar 20 onto gage block 44. After row bar 20 is placed and supported on gage block 44, engagement mechanisms 46 are laterally moved away from row bar 20, exposing the entire length of row bar 20.

Figure 7:
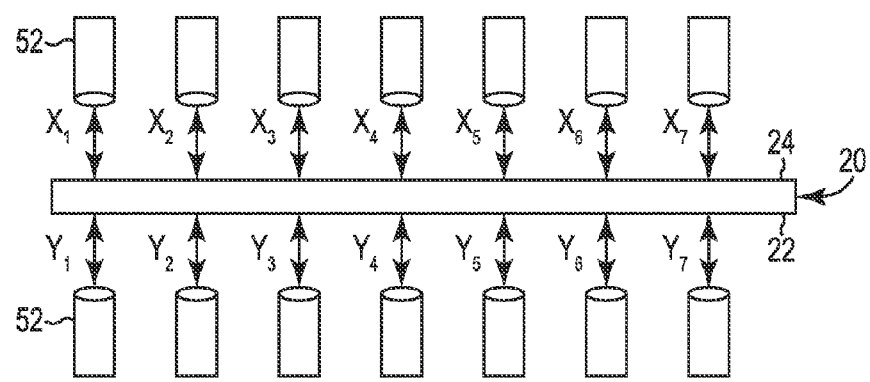
FIG. 7 is a schematic rendition of a method of determining the thickness and profile of a slider row bar.

Measurement unit 50 is laterally positioned so that probes 52 are at or close to one of end 23 or end 25 (FIG. 3) of row bar 20. Base 54, supporting probes 52, is controlled by one of the application programs (e.g., in computer 34 or other processing equipment) so that probes 52 can be moved along the length and/or the height of row bar 20. As seen in FIG. 7, as probes 52 move along the length of row bar 20, each probe 52 measures the distance to its respective side (i.e., ABS side 22 or backside surface 24) of row bar 20. Each probe 52 makes a plurality of distance measurements, $X_1, X_2, X_3$, etc. to backside surface 24 and $Y_1, Y_2, Y_3$, etc. to ABS side 22, respectively. The number of measurements along the length of row bar 20, per probe, depends on the application need. For example, if the step size is 10 μm, 5300 measurements in one scan along the bar length may be made; if the step size is 20 μm, 2650 measurements may be made in one scan. The distance between adjacent measurements along the length of row bar 20 may be, for example, 10 to 100 micrometers, although longer and shorter distances could be used. Probes 52 may make one or multiple passes across row bar 20; if multiple passes are made, the measurements may be made with row scans at various vertical positions. From these measured distances, $X_1$, $X_2$, $X_3$, etc. to backside surface 24 and $Y_1$, $Y_2$, $Y_3$, etc., to ABS side 22, system 30 (FIG. 4) can determine the thickness and the profile of row bar 20.

The measurement device (e.g., testing device 32 of FIG. 4) is operably connected to a computer (e.g., computer 34 of FIG. 4) and/or any other equipment (such as spectrometers, control/display units, etc.) that includes appropriate software to operate testing device 32 and obtain output (e.g., to move probes 52, acquire and save measurement data to file, manipulate and/or graph the data, etc.).

Figure 8:
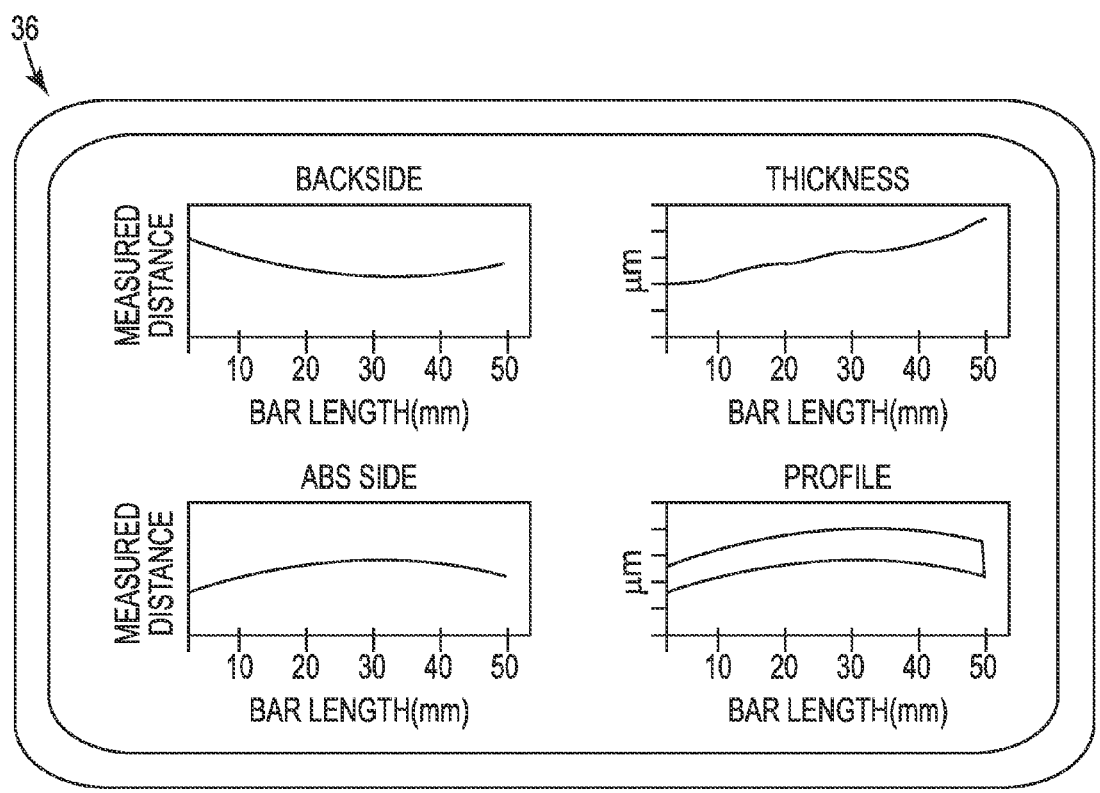
FIG. 8 is a computer screen shot of graphical representations of the thickness and profile of a slider row bar.

FIG. 8 illustrates a possible graphical representation of the measured and determined thickness and profile of row bar 20. In FIG. 8, display screen 36 (e.g., of computer 34) shows four plots obtained from the measured data. In the top left corner, the distance $X_1$, $X_2$, $X_3$, etc. measured by probe 52 to backside surface 24, as a function of the position along the length of bar 20 for a given height on bar 20, is shown. In the lower left corner, the distance $Y_1$, $Y_2$, $Y_3$, etc. measured by probe 52 to ABS side 22, as a function of the position along the length of bar 20 for the same given height, is shown. In the top right corner, the thickness of bar 20, as a function of the position along the length of bar 20, is shown. This thickness can be calculated from the measured distances of the one probe 52 to ABS side 22 and of the second probe 52 to backside surface 24, subtracted from the known distance between the probes 52, for a given height on bar 20. In the lower right corner, the profile of bar 20, as a function of the position along the length of bar 20, is shown. As can be seen from these graphs, the measured row bar 20 has a non-planar ABS side 22 and backside surface 24, and a thickness increasing along its length. Additionally, row bar 20 has an arcuate or curved profile. Depending on the software available, 3D plots can also be displayed from the data file with vertical and horizontal scans, as can 2D contour plots.

Thus, embodiments of the ROW BAR THICKNESS MEASUREMENT DEVICE, SYSTEM AND METHODS are disclosed. The implementations described above and other implementations are within the scope of the following claims. One skilled in the art will appreciate that the present invention can be practiced with embodiments other than those disclosed. For example, the measurement device and system could be used to measure thickness and/or profiles of items other than row bars; the measurement device and system are particularly adapted to measure the thickness and/or profiles of non-transparent (e.g., opaque) items and those items needing a highly accurate and/or precise measurement determination. Additionally, the method (e.g., knowing a distance between a first known point and a second known point, measuring a distance to a surface from the first known point and measuring a distance to another surface from the second known point, and then calculating the thickness of the item by subtracting the distance to the surface from the first known point and the distance to the other surface from the second known point from the distance between the first known point and the second known point) can be used with items other than slider row bars. The disclosed embodiments are presented for purposes of illustration and not limitation, and the present invention is limited only by the claims that follow.

What is claimed is:

1. A device for measuring a thickness and determining a profile of a slider row bar, the device comprising:
   a bar mount fixture having a structure for supporting the row bar by a lower edge thereon,
   a first probe and a second probe, each probe being a non-contact sensor with a measurement precision of 0.5 micrometer, each of the probes oriented toward the structure and laterally moveable in relation to the bar mount fixture.

2. The device of claim 1 wherein the first probe and the second probe are laterally moveable.

3. The device of claim 2 wherein the first probe and the second probe can move at a speed of 1 to 40 mm/second.

4. The device of claim 1 wherein the structure for supporting the row bar is a standard gage.

5. The device of claim 4 wherein the standard gage has a thickness of 0.1 mm to 1 mm.

6. The device of claim 1 wherein the first probe and the second probe are fixedly mounted on a laterally moveable base.

7. The device of claim 1 wherein the probes are spectral-interference laser sensors.

8. The device of claim 7 wherein the probes are precise to within 0.4 micrometer.

9. A system for determining the thickness and profile of a slider row bar, the system comprising the device of claim 1 and software configured to present the measured thickness and determined profile to a user.

10. The system of claim 9 wherein the software includes a graphical output.

11. A device for measuring a thickness and determining a profile of a slider row bar having an ABS side, a backside surface, a trailing edge side surface, a leading edge side surface, a first end and an opposite second end, the device comprising:
    a bar mount fixture having a structure for supporting the row bar thereon, and
    a measurement unit comprising a first probe configured to be positioned proximate the ABS side of the row bar and a second probe configured to be positioned proximate the backside surface of the row bar, each sensor being a non-contact sensor with a measurement precision of 0.5 micrometer, the measurement unit laterally moveable in relation to the bar mount fixture.

12. The device of claim 11 wherein the bar mount fixture has a structure for supporting the row bar by a lower edge thereon.

13. The device of claim 11 wherein the probes are spectral-interference laser sensors.

14. The device of claim 11 wherein the measurement unit further comprising a laterally movable base on which the first probe and the second probe are mounted.

15. A method for determining the thickness and profile of a slider row bar, the row bar having an ABS surface, a backside surface, and a thickness therebetween, the row bar further having a leading edge side surface and a trailing edge side surface, the method comprising:
    supporting the row bar on its leading edge side surface or its trailing edge side surface;
    knowing a distance between a first known point and a second known point;
    measuring a distance to the ABS surface from the first known point;
    measuring a distance to the backside surface from the second known point; and
    calculating the thickness of the row bar by subtracting the distance to the ABS surface from the first known point and the distance to the backside surface from the second known point from the distance between the first known point and the second known point.

16. The method of claim 15 further comprising:
measuring a distance to the ABS surface from a third known point laterally along a length of the row bar from the first known point; and
measuring a distance to the backside surface from a fourth known point laterally along the length of the row bar from the second known point.

17. The method of claim 16 further comprising:
measuring a distance to the ABS surface from a fifth known point laterally along a length of the row bar from the third known point; and
measuring a distance to the backside surface from a sixth known point laterally along the length of the row bar from the fourth known point.

18. The method of claim 15 further comprising determining the profile of the row bar from the distance to the ABS surface from the first known point and from the distance to the backside surface from the second known point.

19. The method of claim 15 wherein the steps of measuring the distance comprise measuring the distance with a non-contact sensor with a measurement precision of 0.5 micrometer.

20. The method of claim 15 wherein the step of supporting the row bar on its leading edge surface or its trailing edge comprises supporting the row bar with no gravitation-induced distortion, bending or waviness.

* * * * *